(12) United States Patent
Mills et al.

(10) Patent No.: US 11,604,359 B2
(45) Date of Patent: Mar. 14, 2023

(54) WEARABLE DEVICES

(71) Applicant: Snap Inc., Santa Monica, CA (US)

(72) Inventors: Rory Thomas Alexander Mills, Rochester (GB); Samuel William Harris, Rochester (GB)

(73) Assignee: Snap Inc., Santa Monica, CA (US)

( * ) Notice: Subject to any disclaimer, the term of this patent is extended or adjusted under 35 U.S.C. 154(b) by 32 days.

(21) Appl. No.: 16/771,318

(22) PCT Filed: Nov. 29, 2018

(86) PCT No.: PCT/GB2018/053447
§ 371 (c)(1),
(2) Date: Jun. 10, 2020

(87) PCT Pub. No.: WO2019/122806
PCT Pub. Date: Jun. 27, 2019

(65) Prior Publication Data
US 2020/0341282 A1  Oct. 29, 2020

(30) Foreign Application Priority Data

Dec. 21, 2017 (GB) ...................................... 1721526
Jan. 16, 2018 (EP) ...................................... 18151820

(51) Int. Cl.
*G02B 27/01* (2006.01)
*G02C 5/22* (2006.01)

(52) U.S. Cl.
CPC ..... *G02B 27/0176* (2013.01); *G02B 27/0172* (2013.01); *G02C 5/22* (2013.01);
(Continued)

(58) Field of Classification Search
None
See application file for complete search history.

(56) References Cited

U.S. PATENT DOCUMENTS 4,311,999 A   1/1982  Upton et al.
9,482,883 B1 * 11/2016 Meisenholder .......... G02C 5/22
(Continued)

FOREIGN PATENT DOCUMENTS

EP   3511767 A1   7/2019
EP   3729185 A1   10/2020
(Continued)

OTHER PUBLICATIONS

International Search Report and Written Opinion received for PCT Application No. PCT/GB2018/053447, dated Jan. 23, 2019. 14 pages.
(Continued)

*Primary Examiner* — Michelle M Iacoletti
*Assistant Examiner* — Danell L Owens
(74) *Attorney, Agent, or Firm* — Schwegman Lundberg & Woessner, P.A.

(57) ABSTRACT

A wearable head-up display which allows for convenient and safe stowage when not in use. A hinge component is positioned within the optical path from an image projector to a display component which ensures optical alignment for projection. A detection means is provided to signal when the wearable device is in a folded position in order to deactivate the projector.

20 Claims, 3 Drawing Sheets

(52) U.S. Cl.
CPC .......... *G02B 2027/015* (2013.01); *G02B 2027/0167* (2013.01); *G02B 2027/0178* (2013.01)

(56) References Cited

U.S. PATENT DOCUMENTS

| | | | |
|---|---|---|---|
| 2010/0245757 | A1 | 9/2010 | Sugihara et al. |
| 2012/0212398 | A1* | 8/2012 | Border .............. G06Q 30/02 345/8 |
| 2013/0329302 | A1 | 12/2013 | Meyre et al. |
| 2015/0261015 | A1 | 9/2015 | Han et al. |
| 2016/0274364 | A1 | 9/2016 | Carollo et al. |
| 2017/0184861 | A1 | 6/2017 | Lammers-Meis et al. |
| 2017/0293147 | A1 | 10/2017 | Tremblay et al. |
| 2017/0371160 | A1* | 12/2017 | Schultz .............. G02B 6/0038 |
| 2020/0278554 | A1* | 9/2020 | Schultz .............. G02B 27/0081 |

FOREIGN PATENT DOCUMENTS

| | | | |
|---|---|---|---|
| GB | 2569599 | A | 6/2019 |
| JP | H10123455 | A | 5/1998 |
| JP | 2002044566 | A | 2/2002 |
| JP | 2006139113 | A | 6/2006 |
| JP | 2008022358 | A | 1/2008 |
| JP | 2008022362 | A | 1/2008 |
| JP | 2008176681 | A | 7/2008 |
| JP | 2012047888 | A | 3/2012 |
| JP | 2014142534 | A | 8/2014 |
| JP | 2016535291 | A | 11/2016 |
| JP | 2021507298 | A | 2/2021 |
| KR | 20200096933 | A | 8/2020 |
| WO | 2012011893 | A1 | 1/2012 |
| WO | 2015058625 | A2 | 4/2015 |
| WO | 2015179802 | A1 | 11/2015 |
| WO | 2017120346 | A1 | 7/2017 |
| WO | 2019122806 | A1 | 6/2019 |

OTHER PUBLICATIONS

GB Search Report under Section 17(5) received for GB Application No. 1721526.0, dated Jun. 20, 2018. 4 pages.
Extended European Search Report received for EP Application No. 18151820.0, dated Jul. 4, 2018. 9 pages.
International Preliminary Report on Patentability received for PCT Application No. PCT/GB2018/053447, dated Jul. 2, 2020. 9 pages.
JP OA received—English Translation JP Application No. 2020-534339, dated Mar. 1, 2022. 3 pages.
"European Application Serial No. 18811337.7, Response to Communication pursuant to Rules 161(1) and 162 EPC filed Jan. 26, 2021", 6 pgs.
"Japanese Application Serial No. 2020-534339, Notification of Reasons for Refusal dated Jul. 6, 2021", w/ English translation, 9 pgs.
"Japanese Application Serial No. 2020-534339, Response filed May 19, 2022 to Notification of Reasons for Refusal dated Mar. 1, 2022", w/ English Translation, 10 pgs.
"Japanese Application Serial No. 2020-534339, Response filed Sep. 30, 2021 to Notification of Reasons for Refusal dated Jul. 6, 2021", w/ English Translation, 12 pgs.
"United Kingdom Application Serial No. 1721526.0, Examination Report under section 18(3) dated Feb. 15, 2022", 2 pgs.
"United Kingdom Application Serial No. 1721526.0, Response filed May 31, 2022 to Examination Report under section 18(3) dated Feb. 15, 2022", 4 pgs.

* cited by examiner

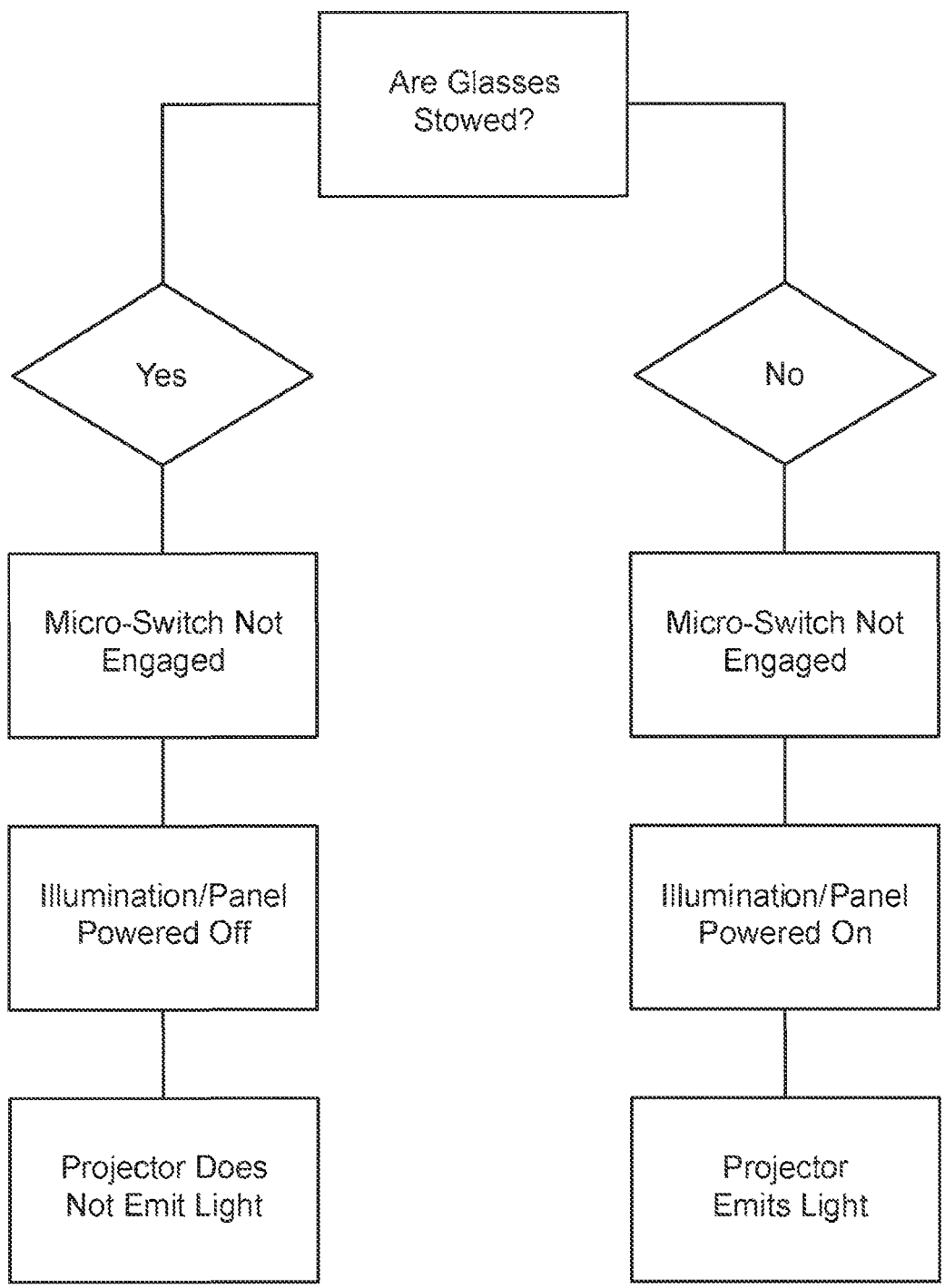

(12)

WEARABLE DEVICES

FIELD OF THE INVENTION

The present disclosure relates to wearable head-up displays.

BACKGROUND ART

Head-up displays overlay a projected image on to a person's view of the real-world, such that they perceive both the real-word image and the projected image. Head-up displays utilise a transparent component through which the user looks and which projects the image such that it appears in the user's vision.

The transparent component may be a fixed component, such as a clear screen in an aircraft, or may be worn by a user. Military applications of wearable head up displays have utilised the visor of a helmet as the transparent component, but this is in inconvenient for non-military applications, and even for certain military applications. Devices with much smaller transparent components, which are worn like spectacles, have been provided, but are still large enough devices such that the optical projection components, such as the light source and optics, prevent folding of the device.

There is therefore a requirement for a wearable head-up display that is compact when both worn and folded.

SUMMARY

Aspects and embodiments of the invention provide a display as claimed in the appended claims.

According to an aspect of the invention there is provided a wearable head-up display, comprising an arm supporting an image projection means and a frame supporting a combiner assembly. The frame may be hingeably attached to the arm such that the combiner assembly is arranged to receive the light output by the image projection means when the hinge is in an unfolded position.

Optionally, the image projection means comprises a light source and a microdisplay. The microdisplay may be illuminated by the light source to output the image-bearing light.

Optionally, the frame may be hingeably attached to the arm at a location between the collimation optic and the combiner assembly. Advantageously, this allows for convenient folding of the display and therefore easy storage and portability.

Optionally, the combiner assembly may comprise an output waveguide. Advantageously, this allows for direction of the image-bearing light.

Optionally, the combiner assembly may comprise a prism. Advantageously, this allows for direction of the image-bearing light.

Optionally, the combiner assembly may comprise a diffraction grating. Advantageously, this allows for direction of the image-bearing light.

Optionally, the combiner assembly may comprise a mirror array. Advantageously, this allows for direction of the image-bearing light.

Optionally, the combiner assembly is arranged to direct received light into a user's eye. Advantageously, this allows for overlaying an image over a user's view of the real world.

Optionally, there is further provided a locking mechanism to retain the wearable head-up display in the unfolded position. The locking mechanism may comprise a magnetic or resistance-based clip. Advantageously, this allows the display to retain the unfolded position, for example during wearing of the display.

Optionally, the image projection means may be arranged to stop outputting light when the hinge is not in the unfolded position. Advantageously, this allows for eye safety protocols to be observed, such as preventing damaging light to be outputted when the display is in the unfolded position. Furthermore, this may allow for power-saving for when the display is folded and not in use.

Optionally, the image projection means may be arranged to output the image-bearing light onto a surface when the hinge is in a folded position. Advantageously, this allows for an alternate method of viewing the image.

Optionally, the arm may be arranged to fold in a plane through the optical axis of the image projection means. Advantageously, this allows for convenient folding of the display and therefore easy storage and portability.

Optionally, the image projection means may comprise a processing device for receiving and processing data indicative of the image produced by the image-bearing light. Advantageously, this allows for the display of computer driven imagery.

BRIEF DESCRIPTION OF THE DRAWINGS

FIG. 4 shows an example flowchart of operation.

DETAILED DESCRIPTION

A head-up display utilizes an optical projection device to project light containing image content into or onto a transparent component, which then directs the light to the user's eye in the required location. Typically, the projection device comprises a light source such as an LED or laser diode, an imaging device such as a DMD, LCD, LCoS or OLED panel, and collimation optics to project the light into or onto the transparent component. To achieve the required brightness and optical quality, these components are of substantial size. For a wearable head-up display instance, these components are integrated into an assembly intended to be worn by a user.

In order to provide suitable positioning and stability of the optical source and collimation optics, these parts have conventionally been formed in a rigid structure with the transparent component, orientated about the head and face of a user. This ensures comfortable mounting and provides rigidity to ensure correct optical alignment and hence image quality. Such an arrangement also addresses safety concerns as light sources can be of sufficient intensity to cause eye damage if viewed directly and not through the correct optical arrangement. However, the resulting devices are rigid, bulky and incapable of convenient folding as per conventional spectacles.

Figure 1:
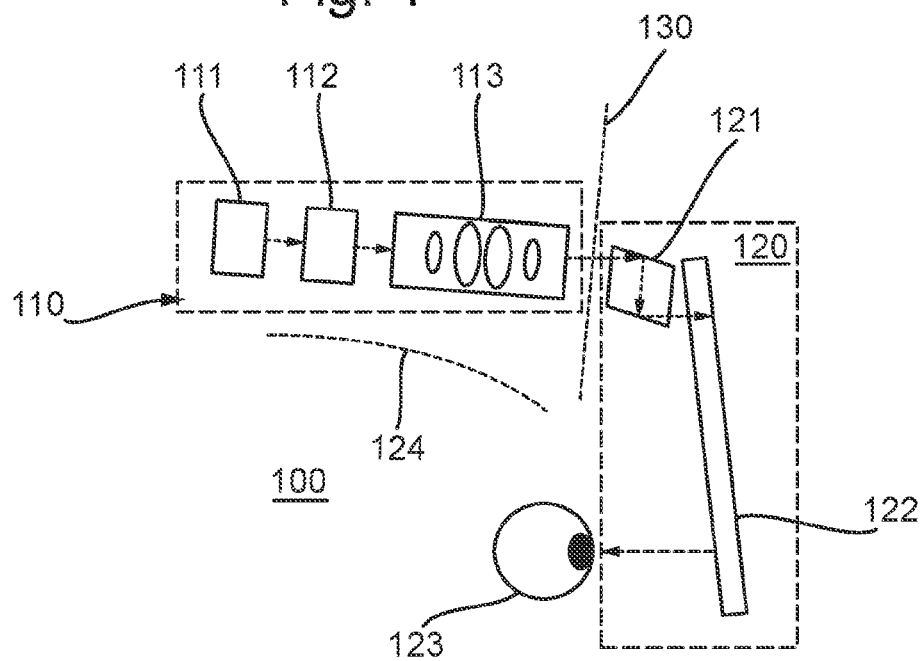
FIG. 1 shows a block diagram of components of a head up display.

FIG. 1 shows a block diagram of the components of a wearable head-up display 100, which can be folded to a convenient size for storage. An image projection means 110 comprises a light source 111 and microdisplay 112 for outputting image-bearing light. The light source 111 is arranged to illuminate the microdisplay 112. The image projection means 110 may further comprise collimation optics 113 for directing the outputted image-bearing light. The collimation optics 113 may comprise one or more lenses. The collimation optics 113 are arranged to produce substantially collimated image-bearing light from the microdisplay. Alternative image projection means may be utilized as appropriate.

The image projection means 110 is configured to output light to a combiner assembly 120. The combiner assembly 120 is configured to be positioned in front of a user's eye 123 and to direct light such that an image is overlaid onto the user's view of the real world. The combiner assembly 120 may comprise a prism 121, which is configured to couple light into output waveguide 122. The prism 121 is situated after the hinge plane 130 about which the image projection means 110 may rotate via use of a hinging mechanism. Using a prism 121 advantageously allows for efficient routing of the projected light directly into the output waveguide 122. This can have multiple advantages; firstly the projected light can be routed in a direction that is off-axis with respect to the optical axis of the previous collimation optics 113, therefore allowing head-up display system to be designed into a space volume that is more conformal to the shape of the arc of the head of a user 124, and therefore more comfortable and more aesthetically favorable. Secondly, prism 121 ensures that the optical path length between the image projection means 110 and the combiner assembly 120 is minimized if a rotating hinge mechanism is introduced about hinge plane 130, thus making the wearable head-up display 100 more compact. Thirdly, the surfaces of the prism may contain optical power, and therefore the prism 121 will form part of the collimation optics 113, thus reducing the number of elements required in the collimation optics 113, making the wearable head-up display 100 more compact.

The combiner assembly 120 may comprise any component that provides the functionality of directing light as required from the image projection means 110 to the user's eye. For example, mirrors and/or diffraction gratings may be utilized in conjunction with a waveguide element.

Figure 2:
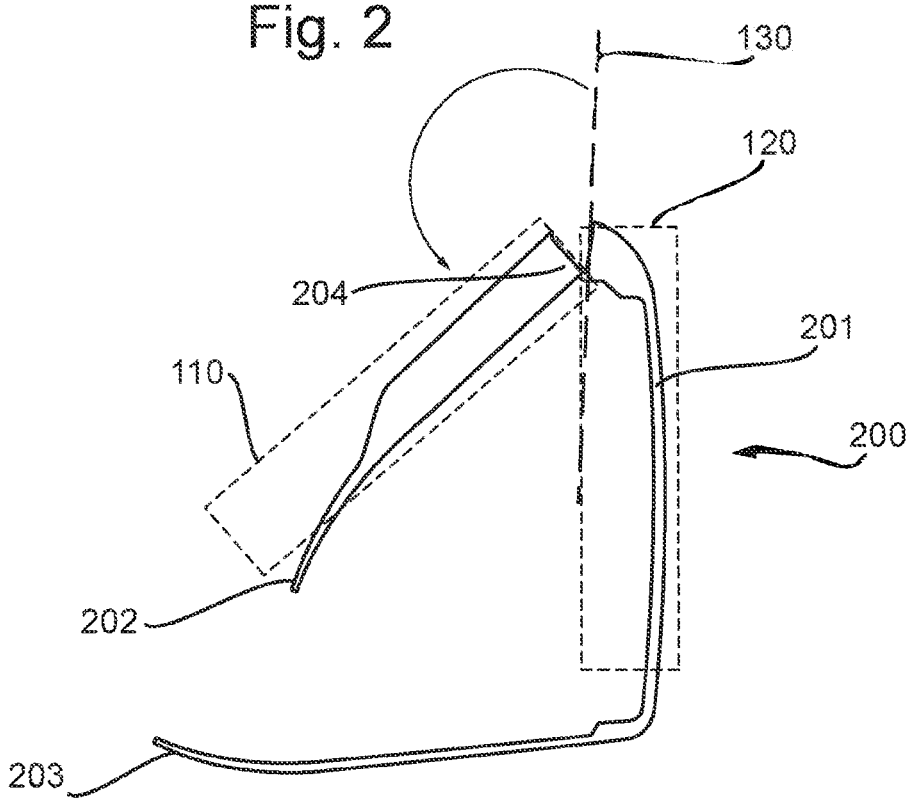
FIG. 2 shows a schematic diagram of a head up display.

FIG. 2 shows a schematic diagram of a head-up display device 200 incorporating the optical components of FIG. 1. The device 200 comprises a front frame 201 and two arms 202, 203 configured as with conventional spectacles. The frame 201 is arranged to support combiner assembly 120, and the arm 202 is arranged to support image projection means 110. The frame 201 may further be arranged to support at least part of the combiner assembly 120 at a location in front of the user's line of vision, such that the image-bearing light may be directed into the user's eye. The arm 202 is hingeably attached to the frame 201 in the conventional manner, i.e. the arm 202 is arranged to rotate around the frame 201 about a point of attachment or joint 204, such that the device 200 can be folded as with conventional spectacles, with the arm now rotated through 90 degrees about the joint 204. In the folded position, the frame 201 and arm 202 of the device 200 are collapsed about the joint 204 to allow for easy storage and portability. Similarly, in an unfolded position the frame 201 and arm 202 of the device may be opened about the joint 204 to achieve a position suitable for wearing of the device by the user. The arm 202 may be hingeably attached to the frame 201 at a location between the image projection means 110 and the combiner assembly 120. As shown by dashed line 130 folding of arm 202 occurs in a plane through the optical axis of the image projection means 110 for projecting the image into the combiner assembly 120.

In order to ensure the image is projected correctly into combiner assembly 120 the joint 204 must be sufficiently rigid when in the unfolded state. The joint 204 may be arranged with a locking mechanism to retain the arm 202 in the unfolded, operational position, which prevents movement or folding at the hinge. For example, a magnetic or resistance-based clip may be utilized.

Figure 3:
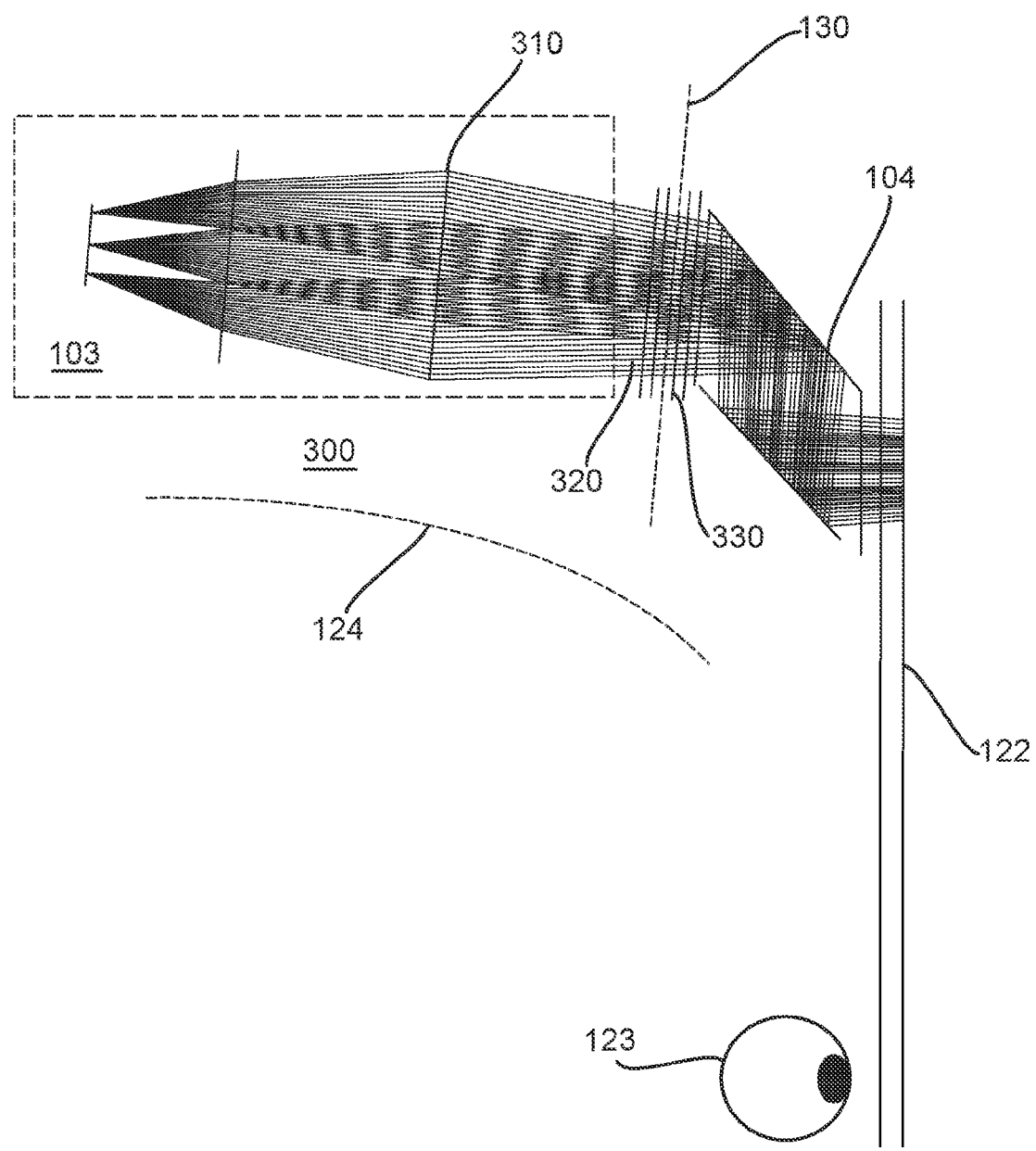
FIG. 3 shows a paraxial optical configuration.

FIG. 3 shows a paraxial optical design 300, which facilitates the arrangement of FIGS. 1 and 2. The hinge plane 130 is located between a final lens 310 of the collimation optics 103 and prism 104. Transparent covers 320, 330, for example glass, are arranged over the collimation optics and prism input to seal those areas and provide adequate environmental sealing. The hinge plane 130 may also be positioned at other locations within the optical system 300 to provide the required folded and unfolded states.

When the device of FIGS. 1 to 3 is folded, light projected by the image projection means 110 may be ejected from the head-up display. To provide a safety system, the image projection means 110 may be arranged to automatically turn off and stop projecting light when the joint 204 is not in the fully unfolded state or when the device is stowed. For example, as exhibited in FIG. 4, a detection means, for example a switch, indicating whether the glasses are folded or stowed may be provided in connection with the hinge arrangement. The image projection means 110 is deactivated once the arm 202 is moved away from the locked or unfolded position.

The optical device 200 may be used with a further optical component when in the folded state to project the image onto a surface such as a wall or screen. The further optical component may signal to the image projection means 110 for enabling (for example by engaging with a switch connected to the hinge) projection of the image.

The devices described herein may be provide with electronic systems to receive data indicative of the image to be projected. For example, a processing device for receiving data via a wired or wireless connection and processing that data for the image projection device may be provided.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A wearable head-up display, comprising:
   an arm supporting an image projector including at least one collimation optic for directing image-bearing light; and
   a frame supporting a combiner assembly, wherein the frame is hingeably attached to the arm by a hinge at a location between the collimation optic and the combiner assembly, such that the combiner assembly is arranged to receive the image-bearing light output by the image projector when the hinge is in an unfolded position.

2. The display of claim 1, wherein the image projector comprises a light source and a microdisplay, arranged such that the microdisplay is illuminated by the light source to output the image-bearing light.

3. The display of claim 1, wherein the combiner assembly comprises one or more of an output waveguide, a prism, a diffraction grating, and a mirror array for directing the received light.

4. The display of claim 1, wherein the combiner assembly is arranged to direct the received light to a user's eye.

5. The display of claim 1, comprising a locking mechanism to retain the wearable head-up display in the unfolded position.

6. The display of claim 5, wherein the locking mechanism comprises a magnetic or a resistance-based clip.

7. The display of claim 1, wherein the image projector is arranged to stop outputting light when the hinge is not in the unfolded position.

8. The display of claim 1, wherein the image projector is arranged to output the image-bearing light onto a surface when the hinge is in a folded position.

9. The display of claim 1, wherein the arm is arranged to fold in a plane through an optical axis of the image projector.

10. The display of claim 1, wherein the image projector comprises a processing device for receiving and processing data indicative of the image produced by the image-bearing light.

11. A wearable head-up display system, comprising:
an image projector configured to output image-bearing light;
an arm supporting the image projector;
a frame to which the arm is hingeably attached by a hinge, such that the arm has a range of movement relative to the frame, the range of movement including an unfolded position and a folded position; and
a combiner supported by the frame and arranged to receive the image-bearing light output by the image projector and to direct the received light to a wearer's eye,
wherein the image projector is arranged to output the image-bearing light onto a surface when the hinge is in a folded position.

12. The system of claim 11, wherein the image projector comprises a light source and a microdisplay, arranged such that the microdisplay is illuminated by the light source to output the image-bearing light.

13. The system of claim 11, wherein the image projector comprises at least one collimation optic for directing the outputted image-bearing light, and the hinge is between the collimation optic and the combiner assembly.

14. The system of claim 11, wherein the arm is a first arm and the hinge is a first hinge, the system further including a second arm hingeably attached to the frame by a second hinge, such that the wearable head-up display system has the form factor of eye glasses.

15. The system of claim 11, wherein the arm is arranged to fold in a plane through an optical axis of the image projector.

16. A wearable head-up display system, comprising:
a processing device configured to receive data;
an image projector including at least one collimation optic and configured to output image-bearing light representative of the data;
a first arm and a second arm, one of the first and second arms supporting the image projector;
a frame to which each of the first and second arms is hingeably attached by a corresponding hinge, such that each of the first and second arms has a range of movement relative to the frame, the range of movement including an unfolded position and a folded position; and
a combiner supported by the frame and arranged to receive the image-bearing light output by the image projector and to direct the received light to a wearer's eye,
wherein one of the corresponding hinges is located between the collimation optic and the combiner.

17. The system of claim 16, wherein the image projector comprises a light source and a microdisplay, arranged such that the microdisplay is illuminated by the light source to output the image-bearing light.

18. The system of claim 16, wherein the wearable head-up display system has the form factor of eye glasses.

19. The system of claim 16, wherein the arm is arranged to fold in a plane through an optical axis of the image projector.

20. The system of claim 16, wherein the image projector is arranged to output the image-bearing light onto a surface when the one of the corresponding hinges is in a folded position.

* * * * *